(12) United States Patent
Margalit

(10) Patent No.: US 9,369,440 B2
(45) Date of Patent: Jun. 14, 2016

(54) SECURING PRIVATE INFORMATION IN PUBLIC, PRIVATE AND MOBILE DEVICES

(75) Inventor: Mordehai Margalit, Zichron Taaqov (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 25 days.

(21) Appl. No.: 13/877,578

(22) PCT Filed: Jul. 24, 2012

(86) PCT No.: PCT/US2012/047982
§ 371 (c)(1),
(2), (4) Date: Apr. 3, 2013

(87) PCT Pub. No.: WO2014/018019
PCT Pub. Date: Jan. 30, 2014

(65) Prior Publication Data
US 2014/0032904 A1    Jan. 30, 2014

(51) Int. Cl.
*H04L 29/06* (2006.01)

(52) U.S. Cl.
CPC .......... *H04L 63/0428* (2013.01); *H04L 63/068* (2013.01); *H04L 63/101* (2013.01)

(58) Field of Classification Search
CPC .... G06F 21/31; G06F 21/6209; G06F 3/0637
See application file for complete search history.

(56) References Cited

U.S. PATENT DOCUMENTS

| | | | |
|---|---|---|---|
| 6,351,813 B1 * | 2/2002 | Mooney et al. | ............... 713/185 |
| 7,383,462 B2 | 6/2008 | Osaki et al. | |
| 7,917,963 B2 | 3/2011 | Goyal et al. | |
| 7,925,023 B2 | 4/2011 | Youn et al. | |
| 7,957,532 B2 | 6/2011 | Chen et al. | |
| 8,769,276 B2 * | 7/2014 | Noh et al. | ...................... 713/168 |
| 2004/0128507 A1 * | 7/2004 | McKenney et al. | ........... 713/170 |
| 2005/0164738 A1 * | 7/2005 | Liu | ................................ 455/558 |

(Continued)

FOREIGN PATENT DOCUMENTS

| | | |
|---|---|---|
| AU | 2008341026 A1 | 7/2009 |
| AU | 2011201188 A1 | 4/2011 |

(Continued)

OTHER PUBLICATIONS

International Search Report and Written Opinion for PCT/US2012/047982 dated Sep. 28, 2012.

(Continued)

*Primary Examiner* — Izunna Okeke
*Assistant Examiner* — Cheng-Feng Huang
(74) *Attorney, Agent, or Firm* — Amin, Turocy & Watson, LLP

(57) ABSTRACT

Technologies are generally disclosed for methods and systems for securing data. An example method may include storing, by a processing device, the data in a memory. The data may be encrypted and accessible only with the use of a decryption key. The method may further include receiving, by the processing device, one or more permission requests to access the data and requesting, by the processing device, the decryption key. In response to receiving the decryption key, the method may include authenticating, by the processing device, the decryption key to verify one or more permissions, and allowing, by the processing device, access to the data in accordance with the one or more permissions.

22 Claims, 5 Drawing Sheets

(56) References Cited

U.S. PATENT DOCUMENTS

| | | |
|---|---|---|
| 2005/0283619 A1 | 12/2005 | Min |
| 2006/0005048 A1 | 1/2006 | Osaki et al. |
| 2007/0136572 A1* | 6/2007 | Chen et al. .................. 713/153 |
| 2008/0019527 A1 | 1/2008 | Youn et al. |
| 2008/0034199 A1 | 2/2008 | Nair et al. |
| 2008/0065878 A1* | 3/2008 | Hutson et al. ................ 713/153 |
| 2009/0037735 A1* | 2/2009 | O'Farrell et al. ............ 713/170 |
| 2009/0235087 A1 | 9/2009 | Bird |
| 2009/0240947 A1* | 9/2009 | Goyal et al. .................. 713/176 |
| 2011/0040964 A1* | 2/2011 | Nussbaum et al. ........... 713/155 |
| 2011/0125649 A1* | 5/2011 | Kukita et al. .................. 705/51 |
| 2011/0191642 A1* | 8/2011 | Adams et al. .................. 714/57 |
| 2011/0225418 A1 | 9/2011 | Shipley et al. |
| 2012/0246485 A1* | 9/2012 | Norimoto et al. ............ 713/189 |

FOREIGN PATENT DOCUMENTS

| | | |
|---|---|---|
| CA | 2709944 A1 | 7/2009 |
| CN | 1710968 A | 12/2005 |
| CN | 100551139 C | 10/2009 |
| CN | 101953111 A | 1/2011 |
| EP | 2232763 A1 | 9/2010 |
| JP | 2011507414 A | 3/2011 |
| KR | 20050119570 A | 12/2005 |
| KR | 20100133953 A | 12/2010 |
| NZ | 586279 A | 8/2012 |
| WO | WO2009079708 A1 | 7/2009 |

OTHER PUBLICATIONS

Computer Worm, http://en.wikipedia.org/wiki/Computer_worm (Printed from Internet Dec. 16, 2012).

WhatsApp Messenger, http://www.whatsapp.com/ (Printed from Internet Dec. 16, 2012).

* cited by examiner

SECURING PRIVATE INFORMATION IN PUBLIC, PRIVATE AND MOBILE DEVICES

CLAIM OF PRIORITY

This application is a U.S. national stage filing under 35 U.S.C. §371 of International Application No. PCT/US2012/047982 filed Jul. 24, 2012 entitled "Securing Private Information in Public, Private and Mobile Devices," the disclosure of which is incorporated by reference in its entirety.

BACKGROUND

The proliferation of electronic devices, such as, for example, smartphones, tablets, personal computers and the like, has allowed for users to complete a wide range of tasks, thereby leading to widespread use and a daily dependence upon the electronic devices. This widespread use inherently causes the storage of significant amounts of data, particularly sensitive private information. The data is unlimited in its content, and may relate to the user or others, such as friends and/or colleagues of the user. The information may be obtained from several different sources, such as from the user, from the user's friends and/or colleagues, from $3^{rd}$ party software, from cookies and the like. Alternatively, the information may be generated by the electronic device. The information may be stored on a storage medium, such as, for example, a device memory or a remote server, and may be accessed by applications. In some cases, the information may be accessed by an application without obtaining permission from the user. In other cases, the user may unwittingly grant permission to the information. As a result, an application may obtain information that the user does not intend to provide.

Typically, information is encrypted to stymie applications from accessing the information. However, a decryption key used to decrypt the information is typically stored on the electronic device. As a result, unauthorized applications have circumvented encryption by obtaining the key and decrypting the information on the device.

SUMMARY

In one embodiment, a method of securing data may include storing, by a processing device, the data in a memory. The data may be encrypted and accessible only with the use of a decryption key. The method may further include receiving, by the processing device, one or more permission requests to access the data and requesting, by the processing device, the decryption key. In response to receiving the decryption key, the method may include authenticating, by the processing device, the decryption key to verify one or more permissions, and allowing, by the processing device, access to the data in accordance with the one or more permissions.

In another embodiment, a system for securing data may include a processing device and a non-transitory, processor-readable storage medium in communication with the processing device. The non-transitory, processor-readable storage medium may contain one or more programming instructions that, when executed, cause the processing device to store the data in a memory. The data may be encrypted and accessible only with the use of a decryption key. The storage medium may further contain programming instructions that cause the processing device to receive one or more permission requests to access the data and request the decryption key. In response to receiving the decryption key, the programming instructions may cause the processor to authenticate the decryption key to verify one or more permissions and allow access to the data in accordance with the one or more permissions.

In still another embodiment, a method of securing data may include storing, by a processing device, data associated with a first application in a memory. The data may be encrypted and accessible only via a decryption key. The method may further include receiving, by the processing device, one or more permission requests for a second application. The one or more permission requests may permit the second application access to a first portion of the data.

In a further embodiment, a system for securing data may include a processing device and a non-transitory, processor-readable storage medium in communication with the processing device. The non-transitory, processor-readable storage medium may contain one or more programming instructions that, when executed, cause the processing device to store data associated with a first application in a memory. The data may be encrypted and accessible only via a decryption key. The storage medium may further include programming instructions that cause the processing device to receive one or more permission requests for a second application. The one or more permission requests may permit the second application access to a first portion of the data.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
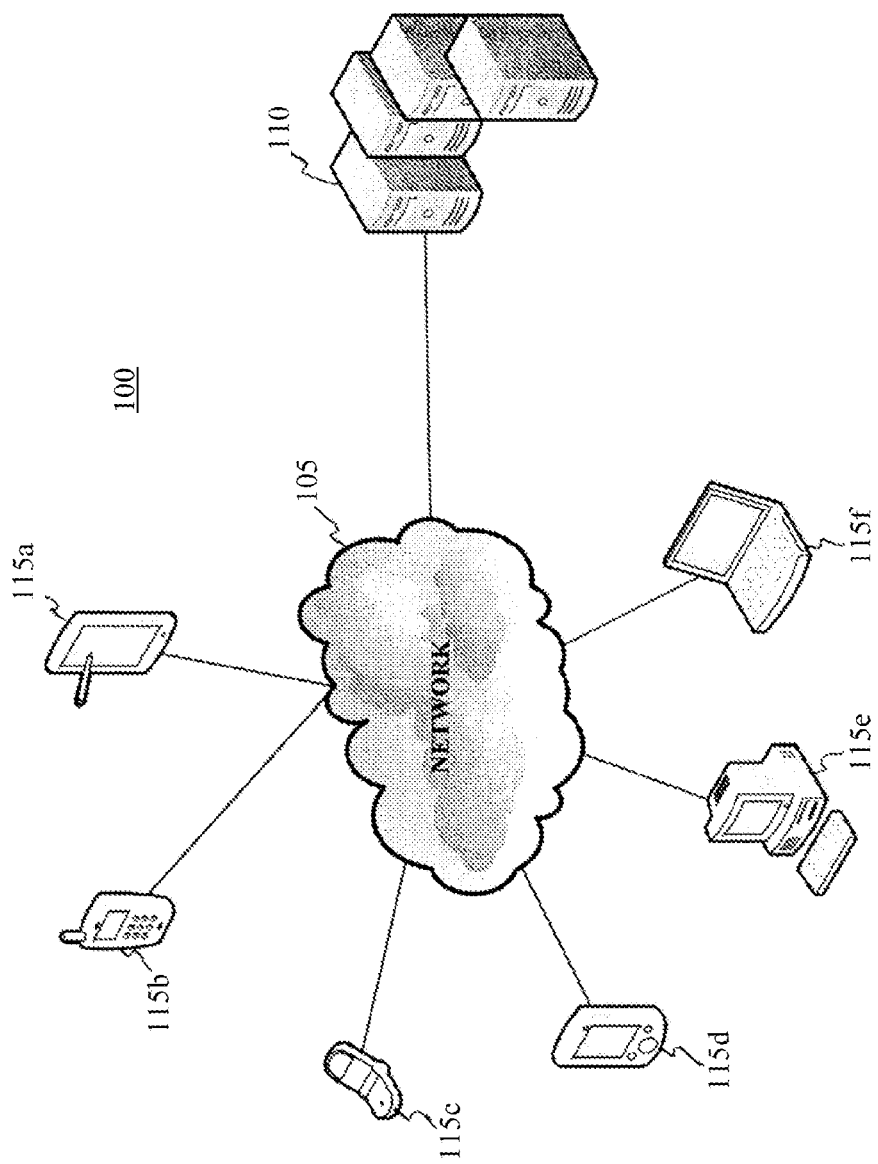
FIG. 1 depicts a general schematic representation of an operating environment, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior art. As used in this document, the term "comprising" means "including, but not limited to."

The following terms shall have, for the purposes of this application, the respective meanings set forth below.

An "electronic device" refers to a device that includes a processing device and tangible, computer-readable memory. The memory may contain programming instructions that, when executed by the processing device, cause the device to perform one or more operations according to the programming instructions. Examples of electronic devices include, but are not limited to, personal computers, gaming systems, televisions, home automation systems and mobile devices.

A "mobile device" refers to an electronic device that is generally portable in size and nature. Accordingly, a user may transport a mobile device with relative ease. Examples of mobile devices include pagers, cellular phones, feature phones, smartphones, personal digital assistants (PDAs), cameras, tablet computers, phone-tablet hybrid devices, laptop computers, netbooks, ultrabooks, global positioning satellite (GPS) navigation devices, in-dash automotive components, media players, watches and the like.

A "computing device" is an electronic device, such as, for example, a computer, a server or components thereof. The computing device can be maintained by entities such as financial institutions, corporations, governments, and/or the like. The computing device may generally contain a memory or other storage device for housing programming instructions, data or information regarding a plurality of applications, data or information regarding a plurality of user preferences and/or the like. The data may optionally be contained on a database, which is stored in the memory or other storage device. The data may optionally be secured by any method now known or later developed for securing data. The computing device may further be in operable communication with one or more electronic devices. The communication between the computing device and each of the electronic devices may further be secured by any method now known or later developed for securing transmissions or other forms of communication.

Referring to FIG. 1, a general schematic representation of an operating environment 100 is depicted, arranged in accordance with at least some embodiments described herein. The operating environment 100 may include one or more computing devices 110 and one or more electronic devices 115 configured to communicate with the one or more computing devices 110 via a communications network 105.

Each of the one or more computing devices 110 may be any computing device having a processing device and a storage medium. In embodiments where more than one computing device 110 is used, each computing device may operate independently of the other computing devices, or may operate in an array-type configuration where the computing devices act as a single unit. The one or more computing devices 110 may optionally contain one or more databases, as described in greater detail herein. The one or more computing devices 110 may generally be used to generate, maintain, manage, update and distribute decryption keys and information relating to decryption keys, such as permission information, user information, application information and the like.

The one or more electronic devices 115, such as, for example, a tablet 115a, a smartphone 115b, a feature phone 115c, a PDA 115d, a personal computer 115e and/or a laptop computer 115f, may generally serve as a primary interface with a user, and may further contain one or more applications that request access to encrypted data, as described in greater detail herein. The one or more electronic devices 115 may communicate with the one or more computing devices 110 via the communications network 105 to request encryption keys to encrypt data and/or to obtain decryption keys to allow access to the encrypted data, as described in greater detail herein.

The communications network 105 may serve as an information highway interconnecting the other illustrated components. The communications network 105 is not limited by this disclosure, and may include any communications network now known or later developed. The communications network 105 may utilize any suitable data communication, telecommunication, wired, wireless or other technology. The communications network 105 may be used to connect any number of devices, systems or components, and may further use any number of communications links. For example, the communications network 105 may use one or more of a local area network (LAN), a wide area network (WAN), a wireless local area network (WLAN), the internet, a cellular network, a paging network, a private branch exchange (PBX) and/or the like.

The one or more computing devices 110 may be coupled to the communications network 105 via a communications link, such as, for example, a wired link, a wireless link or any combination thereof. Furthermore, each electronic device 115 may be coupled to the communications network 105 via a communications link, such as, for example, a wired link, a wireless link or any combination thereof.

Figure 2:
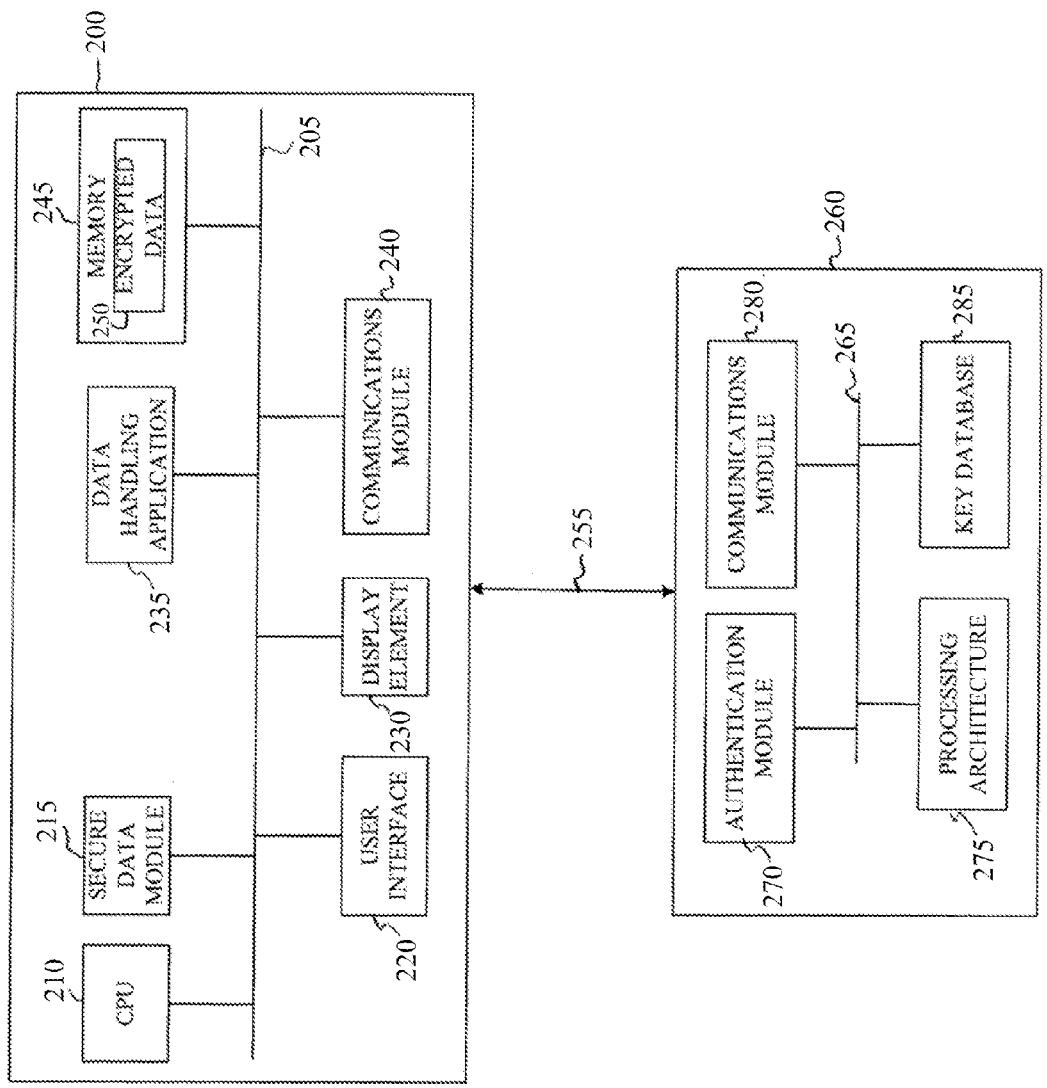
FIG. 2 depicts a schematic representation of communications between an electronic device and one or more computing devices, arranged in accordance with at least some embodiments described herein.

FIG. 2 depicts a schematic representation of communications between an electronic device 200 and one or more computing devices 260, arranged in accordance with at least some embodiments described herein. The electronic device 200 may communicate with the one or more computing devices 260 via a communications link 255, such as the communications network depicted in FIG. 1.

The electronic device 200 may generally include one or more of a CPU 210, a secure data module 215, a user interface 220, a display element 230, a data handling application 235, a communications module 240 and a memory element 245. The modules and/or elements outlined herein are merely examples, and other modules and/or elements may also be included within the electronic device 200 without departing from the scope of the present disclosure. Examples of other modules and/or elements may include, but are not limited to, near field communication (NFC) radios, cellular radios, 802.11 wireless radios and wired data communication interfaces. A bus 205 may serve as an information highway interconnecting the modules and/or elements of the electronic device 200.

The CPU 210 may generally be any processing device that executes one or more operations based on programming instructions stored in the memory element 245. The one or more operations may be completed by the CPU 210, or the CPU 210 may direct other components to complete the operations, as described in greater detail herein.

The CPU 210 may include any number of hardware, software and/or firmware components, as well as any number of logical or functional modules. The CPU 210 may be, for example, a general purpose processing device, a digital signal processor, an application-specific integrated circuit, a field programmable gate array (FPGA), a programmable logic device, a logic gate, and/or combinations thereof. The CPU 210 may further be a microprocessor, a controller, a microcontroller, a state machine or any combination thereof.

The user interface 220 may include, for example, one or more user interface components that may generally be configured to elicit one or more commands to the electronic device 200 when actuated. Examples of user interface components may include keypads, switches, buttons and/or the like.

The user interface 220 may further include a touch sensitive screen. The touch sensitive screen may receive contact based inputs from a user, such as from a user's fingers. The touch sensitive screen may be adapted for gesture control, thus allowing for a user to tap, pinch, swipe or provide other similar gestures to elicit commands to the electronic device 200. The touch sensitive screen may further be capable of sending touch commands to the CPU 210. Examples of touch sensitive screens may include, but are not limited to, resistive touchscreens, capacitive touchscreens, infrared touchscreens and/or other technologies now known or later developed. The user interface 220 may also be configured to receive commands via body gestures, voice, audio signals, device movement and/or the like, which may be completed through the use of microphones, speakers, cameras, barometers, gyroscopes and/or the like.

The display element 230 may generally be used to display images, text, video and the like to a user of the electronic device 200. Examples of display elements may include, but are not limited to, electroluminescent displays, electronic paper displays, vacuum fluorescent displays, light emitting diode (LED) displays, cathode ray tube (CRT) displays, liquid crystal displays (LCDs), plasma display panels (PDPs), digital light processing (DLP) displays, and organic light-emitting diode (OLED) displays.

The communications module 240 may generally provide an interface between the electronic device 200 and the communications link 255. The communications module 240 may be configured to process data transmitted or received via a wired and/or a wireless interface. The wired interface may include, but is not limited to, Ethernet, Human Interface Link (HIL), Musical Instrument Digital Interface (MIDI), Multibus, RS-232 (serial port), DMX512-A, IEEE-488 General Purpose Interface Bus (GPIB), EIA/RS-422, IEEE-1284 (parallel port), UNI/O, ACCESS.bus, 1-Wire, Inter-Integrated Circuit ($I^2C$), Serial Peripheral Interface Bus (SPI), RS-485, any Small Computer System Interface (SCSI), Process Field Bus (Profibus), Universal Serial Bus (USB), FireWire (1394), Fibre Channel, Camera Link, Peripheral Component Interconnect Express (PCI Express), Thunderbolt and the like. The wireless interface may include, but is not limited to, radio frequency (RF), infrared, near field communication (NFC), Bluetooth, any IEEE 802.15 protocol, any IEEE 802.11 protocol, any IEEE 802.16 protocol, Direct Sequence Spread Spectrum (DSSS), Frequency Hopping Spread Spectrum (FHSS), cellular communication protocols, paging network protocols, magnetic induction, satellite data communication protocols, Wireless Medical Telemetry Service (WMTS), Universal Mobile Telecommunications System (UMTS), Global System for Mobile Communications (GSM), General Packet Radio Service (GPRS) and the like.

The memory element 245 may generally be any type of fixed or removable storage device. Examples of memory elements 245 may include, but are not limited to, random access memory (RAM), read only memory (ROM), erasable programmable read only memory (EPROM), electric erasable programmable read only memory (EEPROM), flash memory, magnetic computer storage devices, optical discs, hard disks, removable disks and the like.

The memory element 245 may generally provide storage for data and/or information, such as program data/information, data/information saved by one or more users, programming instructions and/or the like. The data and/or the information may further be encrypted 250 and only accessible with the use of a decryption key that is unique to the data and/or information, unique to the electronic device 200 and/or unique to each application, as described in greater detail herein.

The secure data module 215 may generally be a hardware, software and/or firmware module configured to encrypt and/or decrypt data stored on the electronic device. The secure data module 215 may encrypt and/or decrypt data based upon the encryption key and/or the decryption key received from the one or more computing devices 260, as described in greater detail herein. The secure data module 215 may also cooperate with the data handling application 235 to complete tasks as described in greater detail herein.

The secure data module 215 may further be configured to establish secure communications between the electronic device 200 and the one or more computing devices 260. A secure channel may be established by the requirement of any type of security measure now known or later developed, such as, for example, password entry, a security token and/or the like for network authentication purposes.

The data handling application 235 may act as a sentry between each application and the encrypted data 250 in the memory 245 of the electronic device and/or any encrypted data contained on a remote computing device, such as, for example, the one or more computing devices 260. Thus, the data handling application 235 may receive permissions requests to access the encrypted data 250, may request a decryption key, and may grant access to the encrypted data 250 upon reception of the decryption key and verification of the permissions granted. Alternatively, the data handling application 235 may deny access to the encrypted data 250 if no decryption key is provided, an incorrect decryption key is provided or an expired decryption key is provided, as described in greater detail herein.

The one or more computing devices 260 may communicate with the electronic device via the communications link 255. The one or more computing devices 260 may have, for example, an authentication module 270, a processing architecture 275, a communications module 280, and a key database 285. The list of components illustrated here is merely an example, and other components of the one or more computing devices 260 may be included without departing from the scope of this disclosure. A bus 265 may serve as the main information highway interconnecting the other illustrated components of the one or more computing devices 260.

The processing architecture 275 may generally support the operation of the one or more computing devices 260, including the data processing schemes described in greater detail herein. The processing architecture 275 may be embodied in any number of hardware, software and/or firmware components, and may include any number of logical or functional modules. The processing architecture 275 may be implemented or performed with a processing device, a content addressable memory, a digital signal processor, an application specific integrated circuit, a field programmable gate array, any programmable logic device, any discrete gate or transistor logic, any discrete hardware components and/or the like. The processing device may be, for example, a microprocessor, a controller, a microcontroller, a state machine or the like. Additionally, or alternatively, the processing device may be implemented as a combination of devices, such as, for example, a digital signal processor and a microprocessor, a plurality of microprocessors, and/or the like.

The key database 285 may be a component of the one or more computing devices 260, or may optionally be an independent device in operable communication with the one or more computing devices 260. The key database 285 may generally include information regarding applications seeking access to the encrypted data 250, encryption key information, decryption key information, information about the electronic device 200, information regarding the user of the electronic device 200 and/or the like.

The encryption key information may include, for example, the encryption key, information regarding the types of encrypted data 250 that each encryption key encodes, information regarding the length of time the encryption key is valid, information regarding the number of times the encryption key may be used and/or the like. The type of encryption key is not limited by this disclosure, and may include, for example, a symmetric key, a public-private key pair, a randomly generated key, an authentication key, a benign key, a content-encryption key (CEK), a cryptovariable, a derived key, an ephemeral key, a message encryption key (MEK), a traffic encryption key (TEK), a transmission security key (TSK), a seed key, a signature key, a stream key and/or the like.

Similarly, the decryption key information may include, for example, the decryption key, information regarding the types of encrypted data 250 to which each decryption key grants access, information regarding the length of time the decryption key is valid, information regarding the number of times the decryption key may be used and/or the like. The type of decryption key is not limited by this disclosure, and may include, for example, a symmetric key, a public-private key pair, a randomly generated key, an authentication key, a benign key, a content-encryption key (CEK), a cryptovariable, a derived key, an ephemeral key, a message encryption key (MEK), a traffic encryption key (TEK), a transmission security key (TSK), a seed key, a signature key, a stream key and/or the like.

The authentication module 270 may complete one or more authentication procedures in response to an application request to access at least a portion of the encrypted data 250 in accordance with the example methods described in greater detail herein. Examples of authentication procedures may include, for example, password authentication, biometric data authentication, smartcard-based authentication, handwriting-based authentication and/or the like.

The communications module 280 of the one or more computing devices 260 may generally function similar to that of the communications module 240 of the electronic device 200. The communications module 280 may generally receive requests to access the encrypted data 250, may transmit an authorization in response to the requests, may receive requests to encrypt data in the memory 245 of the electronic device 200 and/or the like.

Using the system depicted in FIG. 2, the data is encrypted in the memory 245 of the electronic device 200 and/or in a remote computing device. The memory 245 and/or the remote computing device may decrypt at least a portion of the encrypted data 250 on an as-needed basis for each application requesting access to the encrypted data 250 upon presentment of a valid decryption key to the one or more computing devices 260 and validation of the decryption key.

Figure 3:
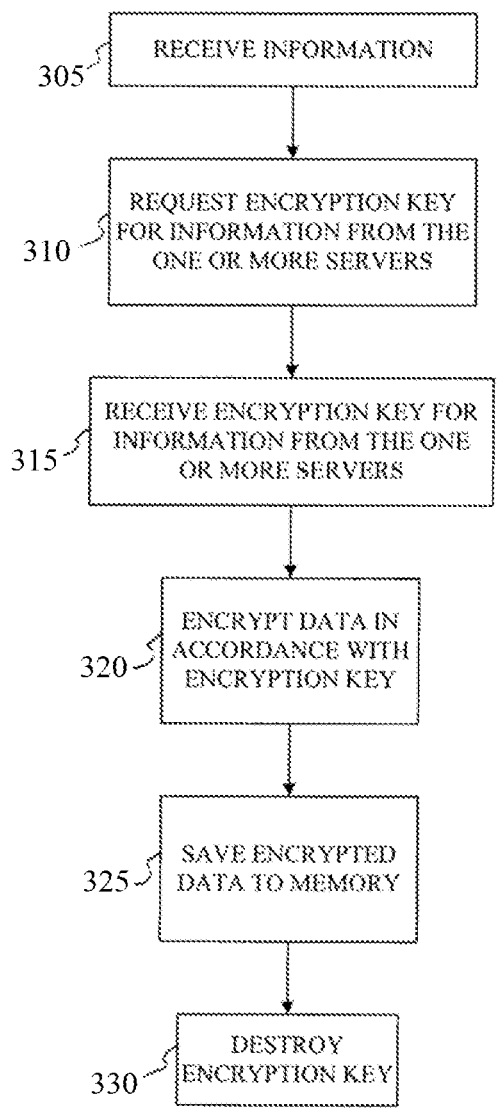
FIG. 3 depicts a flow diagram of an example data encryption method that may be performed by an electronic device, arranged in accordance with at least some embodiments described herein.

FIG. 3 is a flow diagram of an example data encryption that may be performed by the electronic device 200 (FIG. 2), arranged in accordance with at least some embodiments described herein. Example methods may include one or more operations, functions or actions as illustrated by one or more of blocks 305, 310, 315, 320, 325, and/or 330. The operations described in the blocks 305 through 330 may also be stored as computer-executable instructions in a computer-readable medium such the memory element 245 of the electronic device 200 (FIG. 2). Although illustrated as discrete blocks, various blocks may be divided into additional blocks, combined into fewer blocks, or eliminated, depending on the desired implementation.

Beginning at block 305, "RECEIVE INFORMATION", the electronic device may receive data such as data from an application to store in memory, data inputted by a user via a user interface, data obtained from other electronic devices and/or the like. The data is not limited by this disclosure, and may be any data capable of being stored, encrypted and/or decrypted as described herein. Block 305 may be followed by block 310.

At block 310, "REQUEST ENCRYPTION KEY FOR INFORMATION FROM THE ONE OR MORE SERVERS", the electronic device may submit a request to one or more computing devices, such as remote computing devices, for an encryption key to encrypt the data. Block 310 may be followed by block 315, which may be followed by block 320.

At block 315, "RECEIVE ENCRYPTION KEY FOR INFORMATION FROM THE ONE OR MORE SERVERS", the electronic device may receive the encryption key from the one or more computing devices and, at block 320, "ENCRYPT DATA IN ACCORDANCE WITH ENCRYPTION KEY", may encrypt the data according to the encryption key. Block 320 may be followed by block 325, which may be followed by block 330.

At block 325, "SAVE ENCRYPTED DATA TO MEMORY", the data, once encrypted, may be stored in a memory. At block 330, "DESTROY ENCRYPTION KEY", to ensure security of the encrypted data, the encryption key may optionally be destroyed by the electronic device at substantially the time at which the data was encrypted. Destruction may be by any method now known or later developed for deleting encryption keys, rendering encryption keys unreadable, rendering encryption keys unrecoverable and/or the like. The destruction may ensure that the encryption key is unable to be retrieved and/or accessed by an application or a user on the electronic device.

Figure 4:
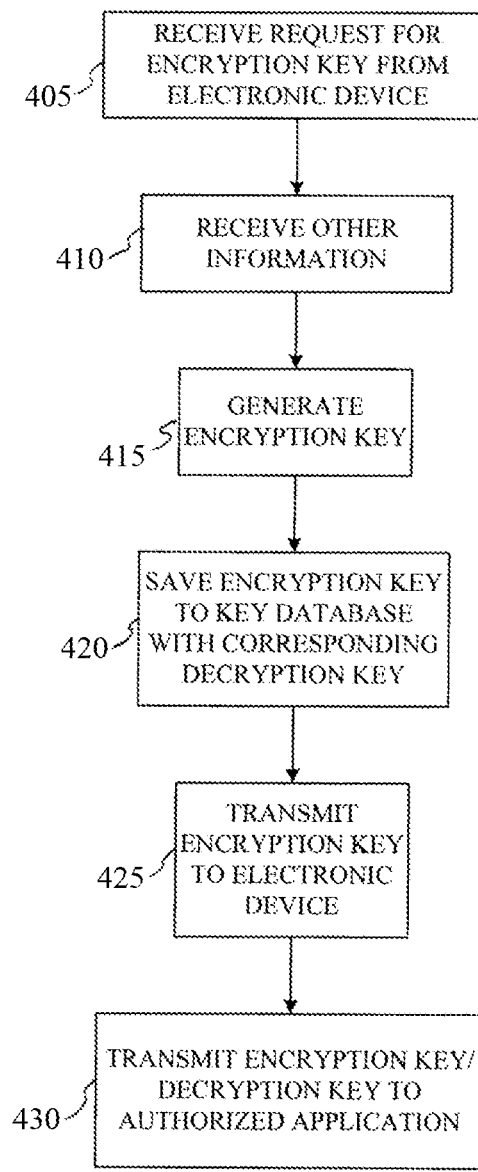
FIG. 4 depicts a flow diagram of an example data encryption method that may be performed by one or more computing devices, arranged in accordance with at least some embodiments described herein.

FIG. 4 depicts a flow diagram of an example data encryption method that may be performed by one or more computing devices, arranged in accordance with at least some embodiments described herein. Example methods may include one or more operations, functions or actions as illustrated by one or more of blocks 405, 410, 415, 420, 425, and/or 430. The operations described in the blocks 405 through 430 may also be stored as computer-executable instructions in a computer-readable medium such the memory element 245 of the one or more electronic devices 200 (FIG. 2). Although illustrated as discrete blocks, various blocks may be divided into additional blocks, combined into fewer blocks, or eliminated, depending on the desired implementation.

Beginning at block 405, "RECEIVE REQUEST FOR ENCRYPTION KEY FROM ELECTRONIC DEVICE", the one or more computing devices may receive a request from an electronic device for an encryption key. Block 405 may be followed by block 410.

At block 410, "RECEIVE OTHER INFORMATION", the one or more computing devices may receive other information. The other information may be, for example, information regarding the application requesting the encryption key, information regarding the information to be encrypted, information about the electronic device that will encrypt the data, information about the memory and/or the remote server that will store the encrypted data and/or the like. The one or more computing devices may receive the request and/or the information from the electronic device, application developers, other computing devices, the key database 285 (FIG. 2) and/or the like. Block 410 may be followed by block 415, which may be followed by block 420.

At block 415, "GENERATE ENCRYPTION KEY", the one or more computing devices may generate an encryption key based upon the request and the information received. At block 420, "SAVE ENCRYPTION KEY TO KEY DATABASE WITH CORRESPONDING DECRYPTION KEY", the encryption key may optionally be saved to the key database with a corresponding decryption key, if a corresponding decryption key is generated. The encryption key may generally be saved for future access, for future generation of a corresponding decryption key, for use as a reference for subsequent encryption/decryption keys and/or the like. Block 420 may be followed by block 425, which may be followed by block 430.

At block 425, "TRANSMIT ENCRYPTION KEY TO ELECTRONIC DEVICE", the one or more computing devices may further transmit the encryption key to the electronic device via the communications modules and/or the secure data module as described in greater detail herein. At block 430, "TRANSMIT ENCRYPTION KEY/DECRYPTION KEY TO AUTHORIZED APPLICATION", the one or more computing devices may additionally transmit the encryption key and/or a corresponding decryption key to an authorized application, an authorized application developer, an authorized user and/or the like. The authorized application, developer and/or user may be deemed authorized if the application, developer and/or user has been vetted for use of at least a portion of the encrypted data. The vetting process may include verification of the user, verification of the device, verification of the application and/or the application developer and setting permissions levels based upon the types and/or amounts of data desired to be shared with various users, applications, application developers and/or the like. The vetting process may also involve ensuring that the decryption keys and/or the encryption keys will not be given to unauthorized entities.

Figure 5:
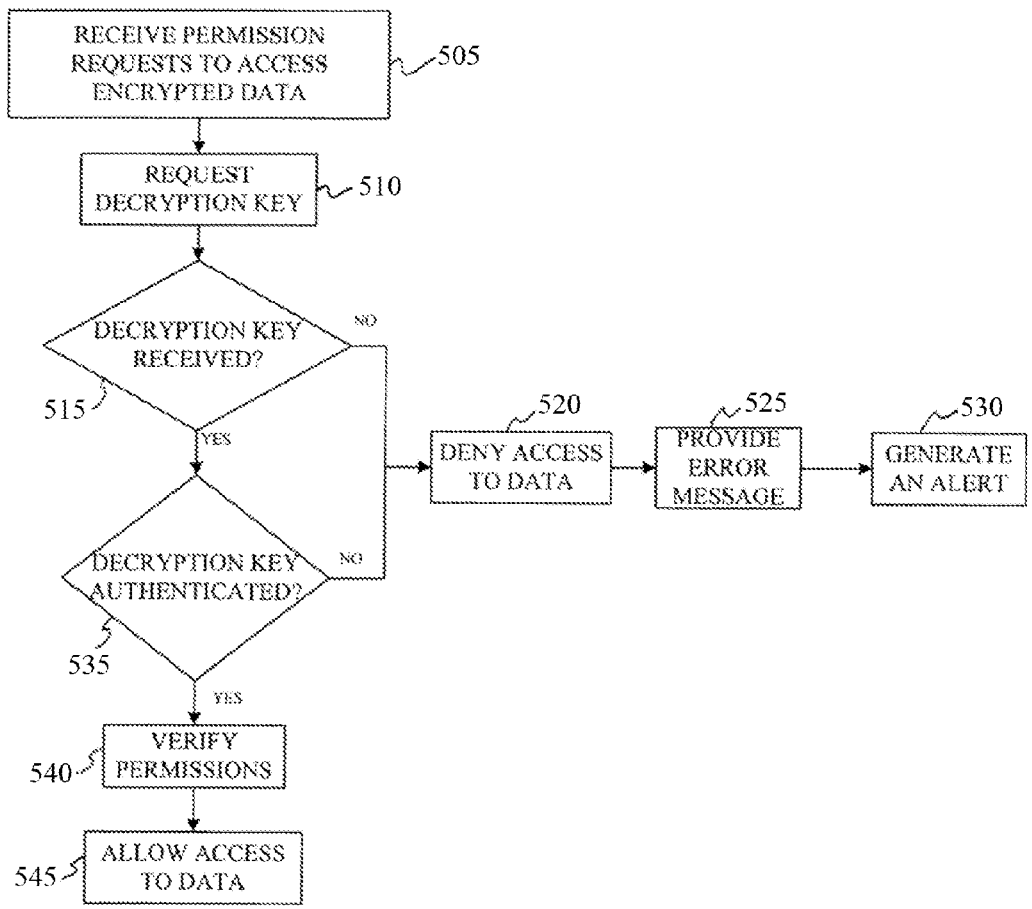
FIG. 5 depicts a flow diagram of an example method for regulating permissions for access to encrypted data, arranged in accordance with at least some embodiments described herein.

FIG. 5 depicts a flow diagram of an example method for regulating permissions for access to encrypted data, arranged in accordance with at least some embodiments described herein. Example methods may include one or more operations, functions or actions as illustrated by one or more of blocks 505, 510, 515, 520, 525, 530, 535, 540, and/or 545. The operations described in the blocks 505 through 545 may also be stored as computer-executable instructions in a computer-readable medium such the memory element 245 of the one or more electronic devices 200 (FIG. 2). Although illustrated as discrete blocks, various blocks may be divided into additional blocks, combined into fewer blocks, or eliminated, depending on the desired implementation.

Beginning at block 505, "RECEIVE PERMISSION REQUESTS TO ACCESS ENCRYPTED DATA", the electronic device may receive one or more permission requests to access the encrypted data. The permission requests may originate from an application that is installed on the electronic device, a user of the electronic device, or a remote computing device that is in operable communication with the electronic device. Block 505 may be followed by block 510.

At block 510, "REQUEST DECRYPTION KEY", the electronic device may request the decryption key from the user, the remote computing device or the application that requested access to the encrypted data. Block 510 may be followed by block 515, which may be followed by either block 520 or block 535.

At block 515, "DECRYPTION KEY RECEIVED?", the electronic device may determine if the decryption key is received. At block 535, "DECRYPTION KEY AUTHENTICATED?", if the decryption key has been received, the electronic device may determine whether the decryption key can be authenticated. The decryption key may be authenticated if the decryption key matches the application, the application developer or the user that provided it to the electronic device, is valid at the time it is presented, and corresponds to the portion of the encrypted data desired to be accessed. Authentication may be completed by the one or more remote computing devices; thus, the electronic device may merely receive the decryption key and immediately pass it on to the remote computing devices for authentication, or the remote computing devices may establish a secure connection between the application, the application developer or the user to receive the decryption key without involving the electronic device. Block 535 may be followed by either block 520 or block 540.

At block 520, "DENY ACCESS TO DATA", if a decryption key is not received or if the decryption key cannot be authenticated, access to the encrypted data may be denied. Denial of access may include failing to provide access (passive denial) or blocking and preventing access (active denial). The use of either passive denial or active denial may be by any method now known or later developed for preventing access to encrypted data. Block 520 may be followed by block 525, which may be followed by block 530.

At block 525, "PROVIDE ERROR MESSAGE", the electronic device may optionally provide an error message such as text, an audio recording, a video recording and/or the like. At block 530, "GENERATE AN ALERT", the electronic device may optionally generate an alert. The alert is not limited by this disclosure, and may include, for example, an audible alert, a visible alert, a haptic feedback alert or a silent alert, such as an alert that transmits a record of the denial of access to a remote computing device, and may optionally include information regarding the application and/or user requesting access, the invalid decryption key (if any), the date and time the request/denial were made, the geographic location of the electronic device at the time of the request and/or denial, information regarding denial procedures and/or the like.

At block 540, "VERIFY PERMISSIONS", if the correct decryption key is received and authenticated, the electronic device may verify permissions by obtaining details regarding which portion(s) of the encrypted data the application/application developer/user is allowed to access, times access is allowed, geographic locations access is allowed and/or any other permissions that may be set. Block 540 may be followed by block 545. At block 545, "ALLOW ACCESS TO DATA", once the permissions are verified, access may be granted 545.

The various embodiments may be realized in the specific example found below.

Example 1

A mobile device includes a sentry application or hardware module that is responsible for accessing all data from a memory of the mobile device. To ensure sentry is able to perform as described herein, the data is encrypted with a key that is unique to each application installed on the mobile device. Other applications installed on the mobile device cannot access the key. Thus, the applications, when providing a series of instructions to be carried out by a CPU on the mobile device, must authenticate with the sentry before accessing the data residing in the memory. Thus, when a first application requests access to data, the sentry checks the first application's request, verifies the first application's authorization to access the data and decrypts the data for the first application to use. When a second application, which is a rogue application, requests access to the data, the sentry checks the second application's request and attempts to verify the second application's authorization to access the data. When the sentry is unable to verify (because it is rogue and hasn't been given a proper key), the sentry will refuse to decrypt the data for the application.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells.

Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method, comprising:
    transforming, by a processing device, data into encrypted data, wherein the data is encrypted with an encryption key generated by and obtained from at least one remote computing device;
    destroying, by the processing device, the encryption key after the transforming the data into the encrypted data;
    storing, by the processing device, the encrypted data in a memory, wherein the encrypted data is accessible only with the use of a decryption key generated by the at least one remote computing device;
    receiving, by the processing device, one or more requests to access the encrypted data from at least one application associated with the processing device;
    requesting, by the processing device, the decryption key from the at least one application; and
    in response to receiving the decryption key:
        transmitting, by the processing device, the decryption key to the at least one remote computing device for authentication of the decryption key and verification of one or more permissions associated with the at least one application,
        receiving, by the processing device, a transmission comprising authorization from the at least one remote computing device, wherein the at least one remote computing device is configured to authenticate the decryption key and determine whether the decryption key is valid for at least a portion of the encrypted data that the at least one application has requested to decrypt,
        transforming, by the processing device, the portion of the encrypted data for which the decryption key is valid into decrypted data with the decryption key, and
        allowing, by the processing device, access to the decrypted data in accordance with the one or more permissions.

2. The method of claim 1, further comprising, in response to not receiving the decryption key, preventing, by the processing device, access to the encrypted data.

3. The method of claim 1, further comprising in response to not receiving the decryption key, generating, by the processing device, an alert to a remote computing device.

4. The method of claim 1, wherein the data comprises information associated with a user identity.

5. The method of claim 1, wherein the decryption key is unique to the data.

6. A system, comprising:
    a processing device; and
    a non-transitory, processor-readable storage medium in communication with the processing device, wherein the non-transitory, processor-readable storage medium contains one or more programming instructions that, when executed, cause the processing device to:
        transform data into encrypted data, wherein the data is encrypted with an encryption key generated by and obtained from at least one remote computing device;
        delete the encryption key after transformation of the data into the encrypted data;
        store the encrypted data in a memory, wherein the encrypted data is accessible only with the use of a decryption key generated by the at least one remote computing device;
        receive one or more requests to access the encrypted data from at least one application associated with the processing device;
        request the decryption key from the at least one application; and
        in response to receiving the decryption key:
            transmit the decryption key to the at least one remote computing device for authentication of the decryption key and verification of one or more permissions associated with the at least one application,
            receive a transmission comprising authorization from the at least one remote computing device, wherein the at least one remote computing device is configured to authenticate the decryption key and determine whether the decryption key is valid for at least a portion of the encrypted data that the at least one application has requested to decrypt,
            transform the portion of the encrypted data for which the decryption key is valid into decrypted data with the decryption key, and
            allow access to the decrypted data in accordance with the one or more permissions.

7. The system of claim 6, wherein the one or more programming instructions further comprise one or more programming instructions that, when executed, cause the processing device to, in response to not receiving the decryption key, prevent the at least one application from accessing the encrypted data.

8. The system of claim 6, wherein the one or more programming instructions further comprise one or more programming instructions that, when executed, cause the processing device to, in response to not receiving the decryption key, generate an alert to for a remote computing device.

9. The system of claim 6, wherein the data comprises information associated with a user identity.

10. The system of claim 6, wherein the decryption key is unique to the data.

11. A method, comprising:
    transforming, by a processing device, a first portion of data into first encrypted data, wherein the first portion is associated with a first application, and wherein the first portion is encrypted with a first encryption key generated by and obtained from at least one remote computing device;
    rendering, by the processing device, the encryption key unreadable after the transforming the first portion of the data into the first encrypted data;
    storing, by the processing device, the first encrypted data in a memory, wherein the first encrypted data is accessible only via a decryption key generated by the at least one remote computing device;
    receiving, by the processing device, one or more requests from a second application associated with the processing device, wherein the one or more requests contain the decryption key;
    transmitting, by the processing device, the decryption key to the at least one remote computing device for authentication of the decryption key and verification of one or more permissions associated with the second application;

receiving, by the processing device, a transmission comprising authorization from the at least one remote computing device, wherein the at least one remote computing device is configured to authenticate the decryption key and determine whether the decryption key is valid for at least a portion of the encrypted data that the second application has requested to decrypt; and transforming, by the processing device, the portion of the first encrypted data for which the decryption key is valid into decrypted data with the decryption key.

12. The method of claim 11, further comprising:

transforming, by the processing device, a second portion of the data into second encrypted data, wherein the second portion is associated with the second application, and wherein the second portion is encrypted with a second encryption key obtained from the one or more remote computing devices.

13. The method of claim 11, wherein the data comprises information associated with a user identity.

14. The method of claim 11, wherein the decryption key is unique to the second application.

15. The method of claim 11, wherein the decryption key is unique to the first encrypted data.

16. A system, comprising:

a processing device; and a non-transitory, processor-readable storage medium in communication with the processing device, wherein the non-transitory, processor-readable storage medium contains one or more programming instructions that, when executed, cause the processing device to:

transform a first portion of data into first encrypted data, wherein the first portion is associated with a first application, and wherein the first portion is encrypted with an encryption key generated by and obtained from at least one remote computing device;

destroy the encryption key after transformation of the first portion of the data into the first encrypted data;

store the first encrypted data in a memory, wherein the first encrypted data is accessible only via a decryption key generated by the at least one remote computing device;

receive one or more requests from a second application, associated with the processing device, to access the first encrypted data, wherein the one or more requests contain the decryption key;

transmit the decryption key to the at least one remote computing device for authentication of the decryption key and verification of one or more permissions associated with the second application;

receive a transmission comprising authorization from the at least one remote computing device, wherein the at least one remote computing device is configured to authenticate the decryption key and determine whether the decryption key is valid for at least a portion of the encrypted data that the second application has requested to decrypt; and transforming, by the processing device, the portion of the first encrypted data for which the decryption key is valid into decrypted data with the decryption key.

17. The system of claim 16, wherein the one or more programming instructions further comprising one or more programming instructions that, when executed, cause the processing device to transform a second portion of the data into second encrypted data, wherein the second portion is associated with the second application, and wherein the second portion is encrypted with a second encryption key obtained from the at least one remote computing device.

18. The system of claim 16, wherein the one or more programming instructions further comprise one or more programming instructions that, when executed, cause the processing device to:

send an alert to the at least one remote computing device.

19. The system of claim 18, wherein the alert is a notification comprising at least one of information regarding the second application, the data, the processing device, and the request.

20. The system of claim 16, wherein the data comprises information associated with a user identity.

21. The system of claim 16, wherein the decryption key is unique to the second application.

22. The system of claim 16, wherein the decryption key is unique to the first encrypted data.

* * * * *